May 30, 1961  M. S. MARTA  2,986,624

WELDING TORCH WITH ADJUSTABLE TIP

Filed May 14, 1959

INVENTOR.
MARTIN S. MARTA
BY
R. E. Geaugue
Attorney

United States Patent Office 2,986,624
Patented May 30, 1961

2,986,624

WELDING TORCH WITH ADJUSTABLE TIP

Martin S. Marta, 5920 Calvin Ave., Tarzana, Calif.

Filed May 14, 1959, Ser. No. 813,195

9 Claims. (Cl. 219—75)

This invention relates to a welding torch with an adjustable tip and more particularly to a welding torch in which the angle of the tip can be quickly adjusted to the work piece in order to cut down operator fatigue and facilitate the welding operation.

In the present types of torches, the welding head containing the tungsten electrode is at a fixed angle to the handle of the torch and the tungsten electrode is supported within the head by a collet. The adjustment of the position of the electrode relative to the head is accomplished by adjustment means located at the end of the fixed head adjacent the handle. Since the welding tip of present torches has a fixed angle to the torch handle, it is often difficult to weld in close, confined spaces. Also, the tip of such welding torches cannot be made adjustable due to the fact that the adjustment for the electrode at the end of the fixed head precludes the use of a universal gas coupling at this location.

In the present invention, the torch head is universally supported by and coupled to the cooling water passage and the inert gas passage extending from the torch handle. The universal coupling comprises one member rigidly connected to these passages and a second member rigidly connected to a component of the welding head. The collet for holding the tungsten electrode permits the position of the electrode to be changed by a force applied directly to the tip of the electrode so that it is unnecessary to have an electrode adjustment at the opposite end of the head where the universal coupling is located.

It is therefore an object of the present invention to provide a welding torch having an adjustable tip supported by a head which is angularly movable relative to the welding torch handle.

Another object of the invention is to provide a welding torch having an adjustable tip supported by a head which is universally coupled to the welding torch handle while providing at all times a flow of inert gas around the welding electrode.

A further object of the invention is to provide a welding torch in which the head containing the electrode is universally connected with the handle and in which the tungsten electrode can be adjusted by applying a force directly to the electrode.

These and other objects of the invention not specifically set forth above will become readily apparent from the accompanying description and drawings in which.

Figure 1:
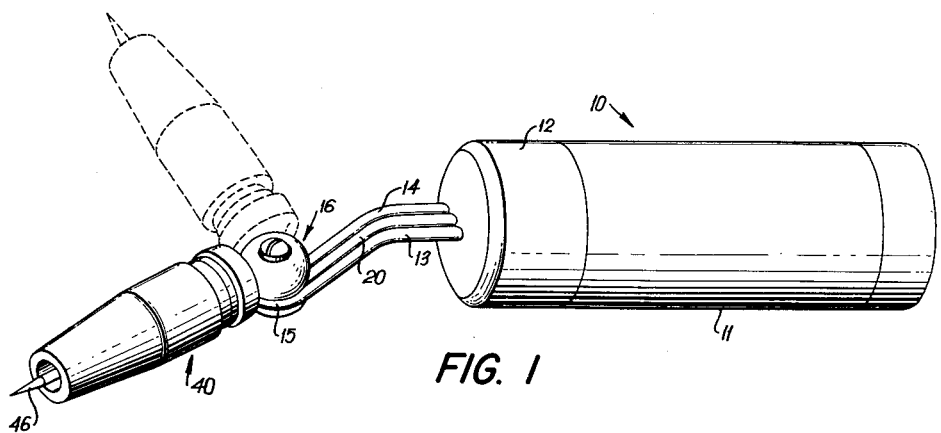
Figure 1 is a perspective view of the welding torch of the subject invention, illustrating two positions of the welding head.
Figure 2:
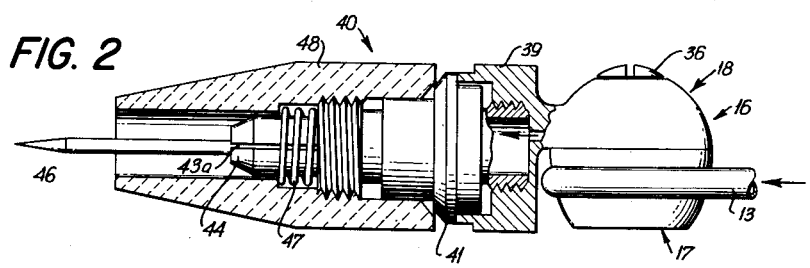
Figure 2 is an enlarged plan view, partly in section, of the angularly adjustable head of the welding torch.
Figure 3:
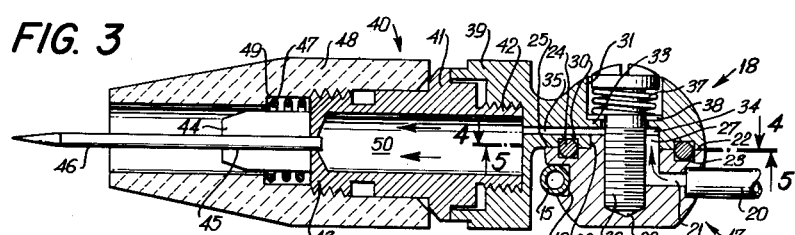
Figure 3 is a sectional view similar to Figure 2, illustrating the universal coupling of the welding head to the torch passages.

Referring to the embodiment of the invention chosen for illustration, the welding torch 10 comprises a handle 11 having a cap 12 for access into the handle. Cooling water is directed through the handle by a cooling passage having sections 13 and 14 extending from the handle and connected together by a loop section 15. The universal coupling 16 comprises coupling members 17 and 18 which have portions in face abutment for rotation relative to one another. The member 17 contains a groove 19 in which the loop 15 is secured. Also, the handle 10 contains an inert gas passage 20 which extends beyond the handle and connects with a passage 21 in the coupling member 17. Thus, the coupling member 17 is rigidly supported by passage 20 and by passage sections 13 and 14.

Figures 4, 5:
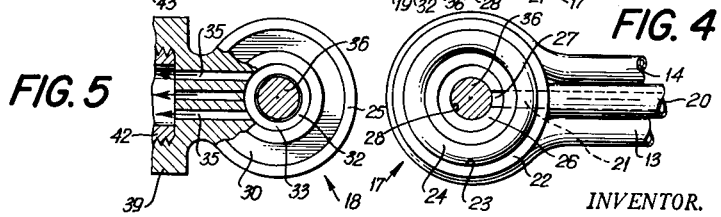
Figure 4 is a sectional view along line 4–4 of Figure 3 illustrating one member of the universal coupling.
Figure 5 is a sectional view along line 5–5 of Figure 3 illustrating the second member of the universal couplings.

As illustrated in Figure 4, the face 22 of member 17 contains a groove 23 for receiving one side of a sealing ring 24. A ring projection 26 extends from face 22 and contains a slot 27 in communication with passage 21. A central, threaded opening 28 is located within projection 26 and the slot 27 is also in communication with the central opening.

The other coupling member 18 has an abutting face 25 containing a groove 30, opposite the groove 23 in the member 17, to receive part of the O-ring 24. The member 18 also contains a cup shaped opening 31 which is separated from a second cup shaped opening 32 by a partition 33. When the adjustable coupling is assembled, the extension 26 of member 17 is inserted into the opening 32 of member 18 while leaving a space 34 in communication with the passage 27. The member 18 also contains three passages 35 in communication with the space 34. The members 17 and 18 are secured together by a bolt 36 which is threaded into opening 28 and a spring 37 is located between the head of bolt 36 and a sealing washer 38 in order to seal the opening in partition 33 and force the coupling members together. This attachment permits relative movement of the members 17 and 18 and the abutting surfaces between the members are continually sealed by the O-ring 24.

A hollow, threaded fitting 39 is integral with the member 18 and forms a part of the welding head 40. The torch head also includes a collet 41 which is threaded at end 42 into fitting 39. The opposite end 43 of the collet contains a plurality of slits 43a defining a plurality of segments 44 having a central opening 45 for receiving one end of tungsten electrode 46. The segments are surrounded by a spring 47 to firmly engage the segments with the tungsten electrode in order to permit adjustment from the tip end and retain it in any adjusted position. A ceramic cover 48 is threaded onto end 43 of the collet and contains a cut away portion 49 for the spring 47. The inert gas, such as Argon, from passage 20 travels through passages 21, 27, 34 and 35 to a central opening 50 in the collet and is then discharged through slits 43a and the cover 48 to provide an inert atmosphere at the tip of the tungsten electrode during welding. Because of the universal coupling, an inert gas atmosphere can be continually maintained independently of the angular position of the head relative to the handle. A potential is placed on the electrode 46 by conduction from a suitable source through passage sections 13, 14, coupling members 17, 18 and collet 41 so that a spark can be struck at the welding area. Since the head 40 and the coupling members 17, 18 are supported by the water cooling passage sections 13 and 14 and the gas passage 20, cooling water circulated through passage sections 13, 14 serves to cool the coupling members and the head of the torch. It is understood that suitable electrical insulation coverings (not shown for purposes of clarity) will cover the passages extending from the handle, the coupling members 17 and 18, the fitting 39 and the portion of collet 41 not covered by the ceramic cover 48 in order to protect the operator against the electrical potential on these members.

By the present invention, a welding torch is provided in which the welding head and electrode can be positioned at various angles to the handle, such as illustrated in Figure 1, in order to facilitate the ease of the welding operation. In all relative positions of the head, inert gas can be transmitted to the electrode and the head can be cooled by a cooling fluid. It is understood that various forms of collet can be utilized in order to hold the electrode 46 in a selected position and still permit its adjustment from the tip end of the electrode. Various other modifications are contemplated by those skilled in the art without departing from the spirit and scope of the invention as hereinafter described in the appended claims.

What is claimed is:

1. In a welding torch having a handle from which extends a cooling passage and an inert gas passage, a universal coupling comprising first and second coupling members, means for holding portions of said coupling members in face engagement, one of said members being adjustable relative to the other of said members about the axis of said holding means, means for connecting said two passages to said first coupling member, a projection from the engaging face of said first member, a cavity in the engaging face of said second member for receiving said projection, a space formed within said cavity between said projection and said cavity, a passage within said projection for continually connecting said space with said gas passage independently of the relative positions of the said coupling members, collett means secured to said second member for holding an electrode, and conduit means for conducting the inert gas from said space past said collett means and to the tip of said electrode to provide an inert gas atmosphere, said axis being substantially normal to the axis of said collet so that said electrode can be positioned from a straight line position with reference to said handle to any pre-determined angled position with reference to said handle.

2. In a welding torch as defined in claim 1 wherein said holding means comprises attachment means extending through said second member centrally of said cavity and threaded into said projection on said first member, said passage extending along said attachment means into said space.

3. In a welding torch as defined in claim 2, sealing ring grooves in said engaging faces to seal the abutting faces of said coupling members, said attachment means comprising a bolt having a head located adjacent said second member, spring means located between said head and said second member for holding said engaging faces together while permitting relative movement therebetween.

4. In a welding torch as defined in claim 1 wherein said collett means comprises a plurality of segments at one end thereof formed by a plurality of slits, a central opening through said segments for receiving said electrode, and spring means for forcing said segments into gripping engagement with said electrode while permitting adjustment of said electrode along said central opening.

5. In a welding torch having a handle from which extends a cooling passage and an inert gas passage, a welding head comprising a collett for supporting an electrode while permitting adjustment of the position of said electrode from the tip end thereof, and a universal coupling for connecting said welding head to said gas passage for transmitting inert gas to the tip of said electrode independently of the relative angular position between said welding head and said passages, said coupling being adjustable about an axis substantially normal to the axis of said collet for positioning said electrode from a straight line position with reference to said handle to any pre-determined angled position with reference to said handle.

6. In a welding torch as defined in claim 5 wherein said universal coupling comprises a first coupling member supported by said passages and a second coupling member secured to said welding head, said members having portions in face engagement, a projection on the engaging face of said first member, a cavity in said second member longer than said projection for receiving said projection, first passage means in said second member for connecting the space remaining in said cavity with the tip of said electrode, and second passage means in said first coupling member for connecting said space with said gas passage at all relative positions of said coupling members.

7. In a welding torch as defined in claim 6, means for holding the engaging faces of said members together, said holding means comprising a bolt extending through said second coupling member and threaded into said projection, a head on said bolt, and spring means located between said bolt head and said second member for continually urging said engaging face portions together.

8. In a welding torch as defined in claim 7 wherein said cooling passage extends around said first coupling member and is secured thereto for removing heat from said welding head, the end of said gas passage being rigidly connected with said first member, said passages serving to support said first member and said relative movable head by said handle.

9. In a welding torch as defined in claim 7, a sealing ring located between said engaging portions for sealing the inert gas in said space, said spring means abutting against a sealing washer to seal the passage for said bolt through said second coupling member.

References Cited in the file of this patent

UNITED STATES PATENTS

| 2,371,945 | Barbeck | Mar. 20, 1945 |
|---|---|---|
| 2,433,018 | Ronay | Dec. 23, 1947 |
| 2,547,872 | Kissick | Apr. 3, 1951 |
| 2,743,346 | Scholl | Apr. 24, 1956 |
| 2,784,293 | Adams | Mar. 5, 1957 |
| 2,797,301 | Copleston | June 25, 1957 |